May 26, 1953 — T. G. FORD — 2,639,451
PORTABLE GLASS WASHER
Filed July 21, 1947
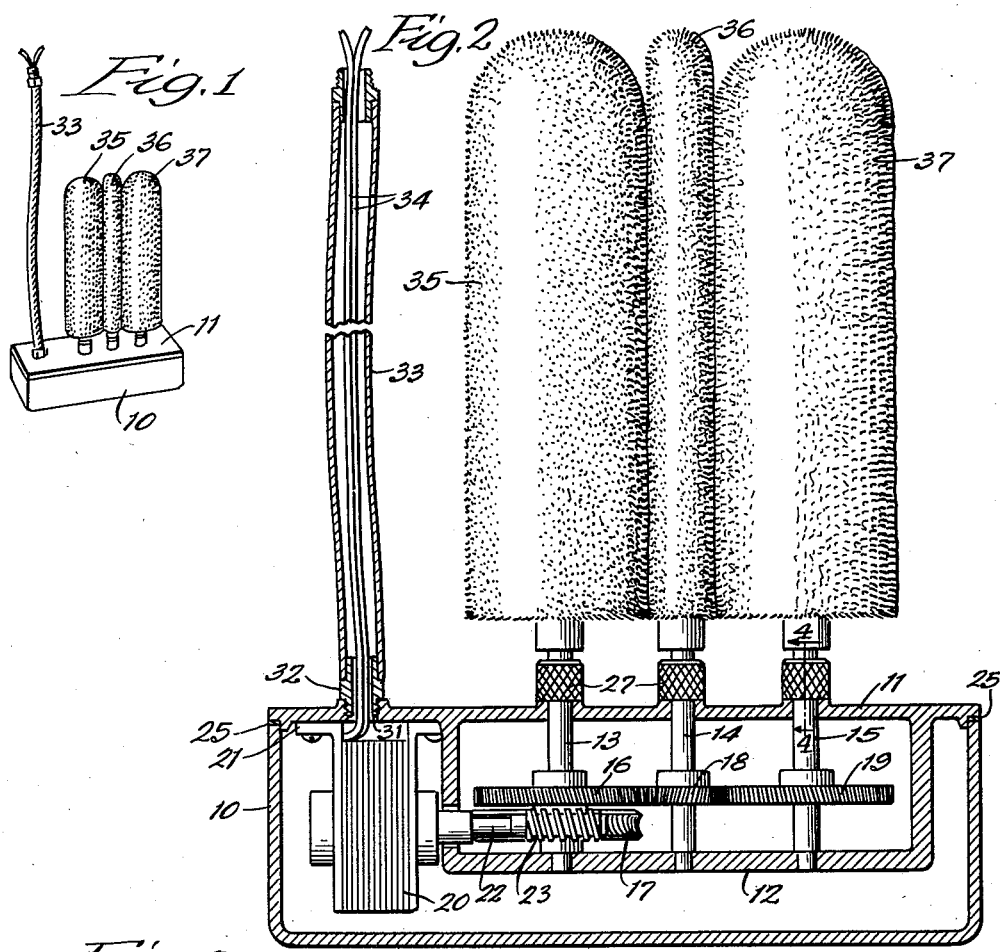
Inventor:
Thomas G. Ford,
By Dawson, Brothers Spengenberg,
Attorneys Patented May 26, 1953

2,639,451

UNITED STATES PATENT OFFICE 2,639,451

PORTABLE GLASS WASHER

Thomas G. Ford, Riverside, Ill.

Application July 21, 1947, Serial No. 762,469

1 Claim. (Cl. 15—76)

This invention relates to portable glass washer and, more particularly, to apparatus for washing glasses, cream jars, bottles, dishes and other containers.

In apparatus heretofore employed for driving rotating brushes in washing basins, it has been the practice to mount the motor at a point outside of the basin and to provide connections for driving gears within the washing apparatus submerged in the water of the basin. Such apparatus is large and difficult to position within the tubs or basins employed, and the motor casing and standards employed form obstacles which prevent the effective use of the brushes.

An object of the present invention is to overcome the above disadvantages and to provide a relatively small and compact structure which is adaptable for being placed in basins or tubs of any type or contour. Yet, another object is to provide an extremely compact washing structure in which the rotating parts operate in an oil body. Yet, another object is to provide an extremely compact structure in which the motor itself is housed within a water-tight casing and which drives gears submerged in oil, the entire casing structure being submerged in the water of the tub or basin. Yet, another object is to provide a structure in which a gear box houses not only the gears for driving washing brushes, but also the motor and in which a cable element provides a relief pressure generated in an oil bath during the operation of the mechanism, permitting an escape of air, etc. from the gear box. Other objects and advantages will appear as the specification proceeds.

The invention is illustrated, in a preferred embodiment, by the accompanying drawing, in which—

Figure 1 is a perspective view of apparatus embodying my invention; Fig. 2, a vertical sectional view; Fig. 3, a top plan view; and Fig. 4, an enlarged detail sectional view, the section being taken as indicated at line 4 of Fig. 2.

In the illustration given, 10 designates the casing of a gear box. 11 designates a closure plate having an integral casing portion 12 supporting shafts 13, 14 and 15. Shaft 13 is equipped with a spur gear 16, and also with a worm gear 17. Shaft 14 is equipped with a spur gear 18, and shaft 15 is equipped with a spur gear 19. The gears 19, 18 and 16 are supported in mesh with each other.

A motor 20 is equipped with brackets 21, which are held by screws to the top plate 11. The motor is an induction type motor, and it drives a motor shaft 22 carrying a worm 23. The worm 23 meshes with the worm gear 17, as shown more clearly in Fig. 2.

The motor 20 may drive the shaft 22 either from a central portion of the motor or from one end thereof, as illustrated in Fig. 3. Further, it will be understood that the drive shaft 22 may be connected for operating the gears 16, 18 and 19 by any suitable connections. For the purpose of illustration, I have shown a simple worm and worm gear connections and spur gear connections.

The entire casing 10 is preferably filled with lubricating oil, and the plate 11 then secured in water-tight relation by means of screws 24. A sealing gasket 25 is preferably interposed between plate 11 and casing 10 to render the connection water-tight.

The shafts 13, 14 and 15 extend through openings in the plate 12 and through bosses 26 aligned with such openings. Each of the bosses 26 is threaded to engage an internally threaded cap 27, as shown more clearly in Fig. 4. The cap 27 is apertured to permit the shaft to extend therethrough and serves to compress a spring 28 which bears against the washer 29. Below the washer 29 is packing 30, which prevents the leakage from the basin into the chamber or from the oil chamber into the basin.

The closure plate 11 is capped at 31 to receive a hollow fitting 32. Secured to a reduced portion of the fitting 32 is a water-tight tube 33, which extends upwardly above the water line of the basin or tub. Electric cables 34 extend through the tube 33, and a space is provided in the tube 33 about the cables 34. The cables 34 contain electric wires which supply current to the induction motor 20. At the same time, the space about the cables provides a relief passage through which air, etc. may escape to relieve pressure within the chamber while the gears are in operation.

Any suitable scrubbing or washing device may be operated by the shafts 13, 14 and 15. On shaft 13, in the illustration given, is mounted a brush 35. A smaller brush 36 is mounted upon shaft 14. A brush 37, similar to brush 35, is carried by shaft 15. It will be understood that brushes of varying sizes and dimensions may be employed, as desired.

Operation

In the operation of the device, the container 10 is filled with oil and the closure 11 sealed as already described. The water-tight housing 33, which may be rigid or flexible, as desired, is drawn upwardly so that the top portion thereof extends above the water level. Upon the operation of a switch connecting the two electric cables to produce current to flow in the motor, the motor 20 starts in operation and drives the mechanism. The worm 23 rotates the worm 17 and thereby gear 16. Gear 16 rotates spur gear 18, and spur gear 18, in turn, drives gear 19. As the gears rotate in the body of oil, a pressure would ordinarily build up tending to force leakage of the oil from the structure. To compensate for this and to prevent the building up of pressure, the fitting 32 and cable 33 permit the escape of air, etc. within the vertical tube 33, and the mechanism operates with substantially no pressure in the oil chamber.

As a result of the cable structure and the arrangement of all the parts within a single gear box, an unusually small and compact structure is provided, and this may be inserted within washing basins or tubs of almost any contour or shape. The entire mechanism takes up very little room and accommodates itself to any type of tub. The tubing 33 may be drawn to a corner or a side of the tub where it is entirely out of the way, thus freeing the tub from all obstacles.

The apparatus has been operated for long periods with the gear box thereof entirely submerged in water and without any evidence of leakage from the oil chamber into the basin or from the basin into the oil chamber. The apparatus is effective when hot water is employed. The induction motor operates effectively in oil at temperatures of 170° C. and higher. The flexible tubing 33 is constantly maintained in a vertical position for an effective length by the side wall of the tub, etc. and beyond the side wall, the tube may be turned downwardly so as to be entirely out of the way. It will be understood that the gears may be arranged in a variety of combinations, and the gear arrangement shown is merely for the purpose of illustration of one of such arrangements.

While in the foregoing specification, I have set forth the structure in great detail for the purpose of illustrating one embodiment of the invention, it will be understood that the details of such structure may be varied widely by those skilled in the art without departing from the spirit of my invention.

I claim:

In washing apparatus of the character set forth, a casing providing a container adapted to receive oil, a closure plate adapted to provide a watertight closure for said container, shafts supported by said closure plate for rotation and extending therethrough, gears connected to said shafts within said casing, an induction motor mounted within said casing and suspended from said closure plate, means connecting the shaft of said motor with said gears to operate the same, a pair of large brushes carried by two of said shafts mounted in said closure, a small brush carried by another shaft mounted in said closure and extending between said first-mentioned brushes in close juxtaposition therewith, cables extending through said closure plate to supply current to said motor, and a water-proof flexible tube joined to the casing for enclosing said cables and providing a pressure relief passage from the interior of the casing, said tube being of sufficient length to extend above the level of the liquid in which the apparatus is to be immersed.

THOMAS G. FORD.

References Cited in the file of this patent

UNITED STATES PATENTS

| Number | Name | Date |
|---|---|---|
| 1,687,617 | Jewell | Oct. 16, 1928 |
| 1,954,833 | Schwarzkopf | Apr. 17, 1934 |
| 2,002,914 | Mendenhall et al. | May 28, 1935 |
| 2,032,916 | Cunningham | Mar. 3, 1936 |
| 2,127,680 | Edmondson | Aug. 23, 1938 |
| 2,180,408 | Fielding | Nov. 21, 1939 |
| 2,242,361 | Lewis | May 20, 1941 |
| 2,255,081 | Nielsen et al. | Sept. 9, 1941 |
| 2,430,769 | Hutchinson | Nov. 11, 1947 |
| 2,432,291 | Dayton | Dec. 9, 1947 |

FOREIGN PATENTS

| Number | Country | Date |
|---|---|---|
| 365,692 | Great Britain | Jan. 28, 1932 |
| 557,318 | Germany | Aug. 22, 1932 |